Feb. 21, 1967 H. H. KOUNS 3,304,884
HYDRAULIC FLUID ENERGY TRANSLATING DEVICE
Filed Jan. 18, 1965 2 Sheets-Sheet 1

INVENTOR.
HERBERT H. KOUNS
BY
WOOD, HERRON & EVANS

Feb. 21, 1967   H. H. KOUNS   3,304,884
HYDRAULIC FLUID ENERGY TRANSLATING DEVICE
Filed Jan. 18, 1965   2 Sheets-Sheet 2
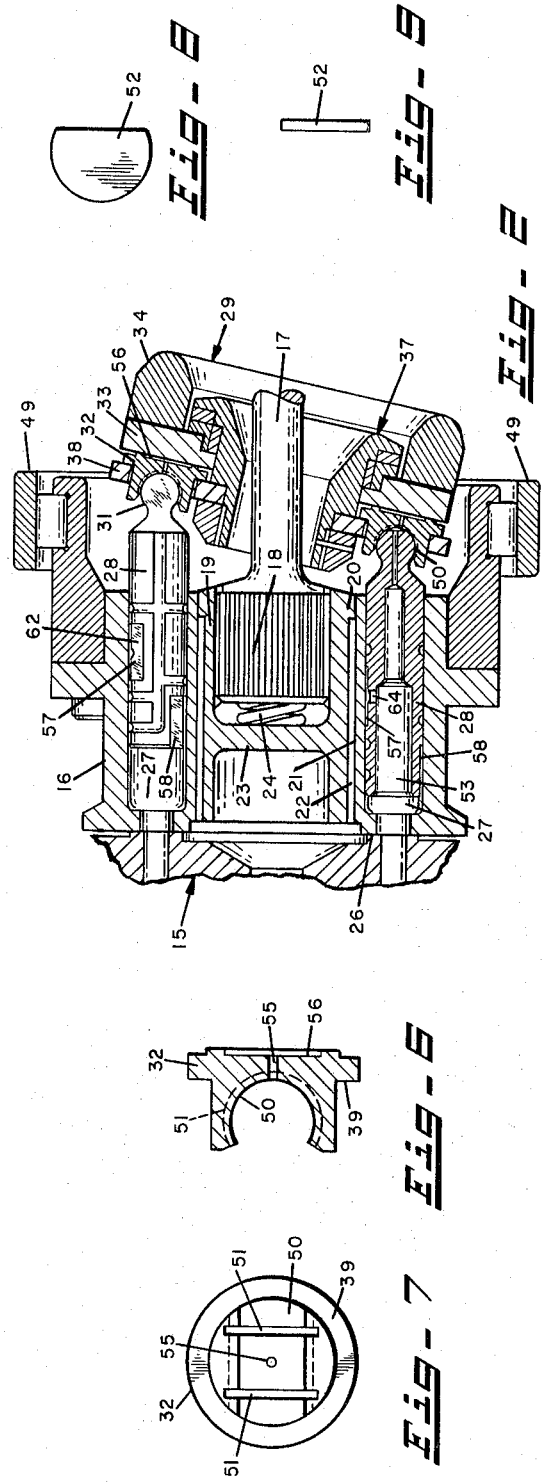
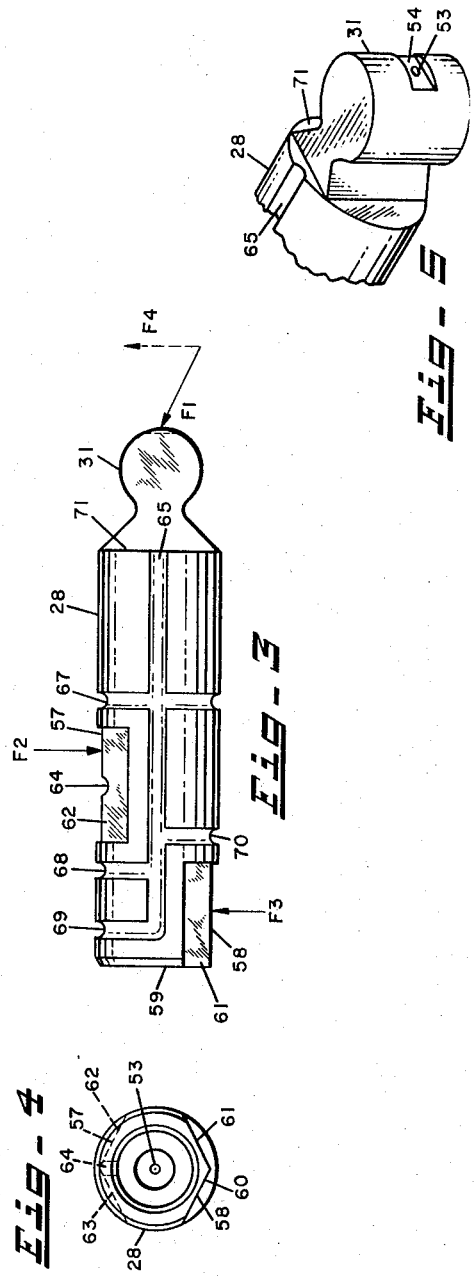
INVENTOR.
HERBERT H. KOUNS
BY
WOOD, HERRON & EVANS

# United States Patent Office 3,304,884
Patented Feb. 21, 1967

3,304,884
HYDRAULIC FLUID ENERGY TRANSLATING DEVICE
Herbert H. Kouns, Camarillo, Calif., assignor to Abex Corporation, a corporation of Delaware
Filed Jan. 18, 1965, Ser. No. 426,243
10 Claims. (Cl. 103—162)

This invention relates to hydraulic fluid energy translating devices and more particularly to hydraulic pumps or motors of numerous types which include reciprocable pistons.

Pumps and motors of the types above referred to are well known in the art and they include a plurality of pistons which extend into and reciprocate in cylinders. The outer end of each of these pistons is usually connected through a ball and socket type universal joint to a piston shoe which rides upon a cam means. The cam means may take any of several forms as is also well understood in the art. In these pumps or motors, when hydraulic fluid in the cylinder urges the piston toward the cam means, or vice versa, the forces acting on the piston cause it to bear against one side of the cylinder adjacent the ball joint or outer end of the piston and against the opposite side of the cylinder at the inner end of the piston.

The forces above referred to create a substantial side thrust or lateral pressure between the pistons and the cylinder walls, and this pressure is undesirable since, among other things, it causes excessive break away differential pressure requirements and high minimum speed characteristics. By reducing this lateral or side pressure friction, the efficiency of the machines may be substantially increased. It is therefore an object of this invention to eliminate the effects of this undesirable lateral or side pressure on the piston. According to this invention, this pressure together with its resulting wear and heating problems is obviated by means of hydrostatic balance "pads" acting between the pistons and the cylinder bores.

Specifically, it has been found that this lateral pressure or piston side force acts unidirectionally, due to the cam slope angle, therefore it is mandatory to orient any counteracting forces accordingly if the effect of this lateral pressure or friction loss is to be eliminated. By application of hydrostatic balance "pads" to the pistons together with a direction control joint between the piston shoes and the piston, counter-balancing forces are derived which are oriented counter to or in opposition to the lateral side component of the friction force produced by the cam.

It has, therefore, been an objective of this invention to provide oriented pressure pads between the pistons and cylinder walls operated to create forces upon the pistons counter to the lateral pressure created by the cam plate acting upon the end of the piston.

Another objective has been to provide isolated pressure pad areas on the surface of the pistons effective to counterbalance side forces or lateral pressure induced by the cam plate acting angularly relative to the piston axis.

Still another objective of this invention has been to provide a hydraulic fluid energy translating device having lower break away differential pressure characteristic and a lower minimum speed characteristic than has heretofore been possible.

These and other objectives and advantages of this invention will be more readily apparent from a description of the drawings in which:

FIG. 2 is a view on a larger scale of a portion of FIG. 1 rotated 90° and showing one of the pistons and piston shoes in cross section;

FIG. 3 is a view in elevation on a larger scale showing external details of a piston;

FIG. 4 is a view of the left-hand end of the piston seen in FIG. 3;

FIG. 5 is a view in perspective of the right-hand end portion of the piston seen in FIG. 3;

FIG. 6 is a cross-sectional view on a larger scale of one of the piston shoes seen in FIGS. 1 and 2;

FIG. 7 is an end view of the piston shoe;

FIG. 8 is a side view in elevation of a key employed to retain the piston shoe on the piston; and FIG. 9 is an end view of the key seen in FIG. 8.

Figure 1:
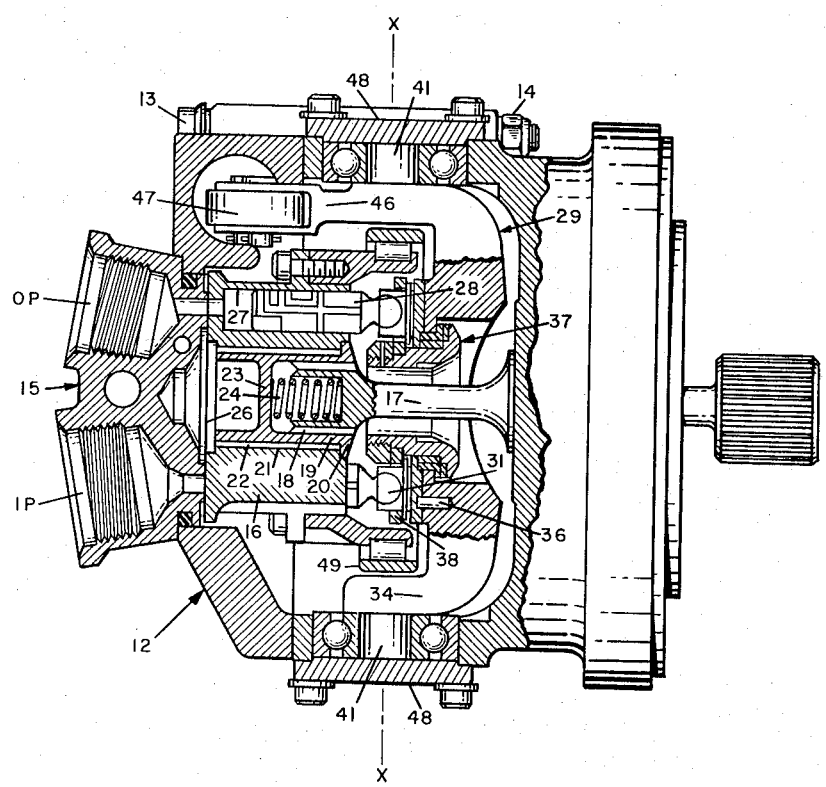
FIG. 1 is a longitudinal view in section of one form of hydraulic fluid energy translating device to which the invention is applicable and in which the invention is embodied.

Referring first to FIG. 1 of the drawings, there is shown one type of hydraulic energy translating device which may function either as a pump or a motor and which includes the features of this invention. This device will be described herein as a pump. The device includes an outer casing 12 of multiple-part construction suitably assembled together as by a plurality of tie bolts 13 and fastening nuts 14. The outer casing 12 includes a head 15 which is formed with an inlet port IP and an outlet port OP, each of which is adapted to have a conventional coupling attached therein.

A generally annular-shaped cylinder block, barrel or body 16 is generally centrally disposed within the outer casing 12 and is adapted to be rotated therein by a drive shaft 17. Thus, the shaft 17 is formed with external splines 18 at the inner end thereof which are engageable with internal splines formed on a sleeve member 19, which is in turn axially disposed within a longitudinally extending central bore 21 formed in the annular cylinder barrel 16. The sleeve member 19 is connected to drive the cylinder barrel 16 through a splined connection 22. As illustrated in FIG. 1, the sleeve 19 is preferably formed with a web 23 extending across the interior thereof and a spring 24 is interposed between the web 23 and the end of the shaft 17. The sleeve 19 also includes a radially extending flange 20 which is seated within an annular recess formed within one face of the cylinder barrel 16 to prevent axial movement of the cylinder barrel 16 in one direction. The opposite face of the cylinder barrel 16 is engageable with and slidable on the inner face of the head 15 at the plane indicated by the reference numeral 26 so that the cylinder barrel is maintained in a fixed axial position within the outer casing.

The cylinder barrel 16 is formed with a plurality of axially extending cylinders or bores 27 disposed in an annular array. These bores 27 form chambers which are placed in alternate communication with the inlet port IP and the outlet port OP during rotation of the cylinder barrel 16.

Cylindrical pistons 28 are slidable within the bores 27 and are adapted to be reciprocated back and forth therein by fluid under pressure entering them from the inlet port and a swash plate mechanism indicated generally by the reference numeral 29. Thus, each of the pistons 28 is rounded cylindrically, as indicated by the reference numeral 31, at the end which projects from the cylinder barrel 16 (FIGS. 2, 3, and 5). The rounded ends of the pistons 28 are received within complementary-shaped recesses formed in slippers or shoes 32, thus affording a knuckle connection between the pistons 28 and the shoes 32. The shoes 32 are in turn slidable along the surface of a swash plate 33 in the course of the rotation of the cylinder barrel 16 and the pistons 28 carried therein. The swash plate 33 is suitably affixed to a hanger member 34 as by a series of pins 36, and the shoes 32 are maintained in engagement with the swash plate 33 by a retainer assembly 37 which includes a ring 38 engageable with a radial flange 39 formed integrally on the shoes 32.

The hanger 34 is journalled for rotation about an axis X—X by means of pivot bosses 41 disposed within bearings mounted within the outer casing. The hanger member 34 also includes a crank arm 46 which is connected to an actuating member 47. Thus, the angular inclination of the swash plate 33 and thus the stroke of the pistons 28 and the displacement of the motor 11 is variable from a small minimum displacement to a larger displacement and vice versa in response to the signal applied to the actuating member 47. Preferably, access plates 48 are removably secured, as by cap screws, to the outer casing 12 to facilitate installation or replacement of the bearings. Also, a bearing which includes a circumferentially extending outer race 49 is mounted on the cylinder barrel 16 by cap screws. The bearing race 49 acts with other structure, not illustrated, to position the barrel and reduce the friction due to rotation at high speeds.

As thus far described, the structure of the motor 11 is effective to operate in a conventional mode to receive fluid from the inlet port IP during the time that a piston 28 is moved outwardly of a bore 27 by the inclination of the swash plate 33, any movement of the piston 28 inwrdly of the bore 27 during continued rotation of the cylinder barrel 16 is effective to transfer the fluid to the outlet port OP.

A study of FIG. 2 of the drawings shows that the pistons 28 rotate within the cylinder bores 23 as the cylinder barrel 16 rotates but that they do not rotate upon their own axes. Rotation of each piston 28 about its own axis is precluded by the knuckle joint formed by the cylindrical end 31 of the piston 28 and a similarly contuored socket 50 formed in the piston shoe 32. The socket 50 is generally in the shape of a cylindrical bore having approximately 150° of the complete 360° bore wall cut away. This cut away 150° section is the entry area through which the neck of the outer end of the piston extends so as to permit pivotal movement of the shoe 32 relative to the piston 28 about the axis of the cylindrical portion 31. In other words, this knuckle type connection limits movement of the shoe 32 relative to the piston to a single plane and, since the piston shoe 32 is held in engagement with swash plate 33, rotational movement of the pistons about their longitudinal axes is precluded and the pistons circulate around the axis of the shaft 17 as the cylinder barrel 16 rotates with the pistons 28 rotating in their bores 27 and the shoes 32 rotating with respect to the swash plate 33 as they slide over it.

The arcuate shoe socket 50 is interrupted by a pair of key slots 51 (FIGS. 6 and 7) which are spaced apart the width of the end section 31 of the piston. A pair of flat generally semi-cylindrical keys 52 (FIGS. 8 and 9) are fitted into the slots 51 so as to preclude substantially any axial movement between the shoe 32 and the piston 28.

As may be seen most clearly in FIG. 2, an axial bore 53 extends completely through each piston 28 and this bore connects the cylinder 27 with a flat 54 milled in the cylindrical section 31 of the piston 28 (FIG. 5). This flat 54 communicates with an aperture 55 in the piston shoe (FIGS. 6 and 7) in all pivotal positions of the shoe with respect to the piston. The aperture 55 in turn communicates with a recessed area 56 in the back of each piston shoe. This recessed area 56 acts as a fluid reservoir between the piston shoe and the cam plate. Thus high pressure hydraulic fluid from the cylinder 27 may flow through the axial bore 53 of the piston to the area between the piston shoes 32 and the swash plate 21 to act to reduce the mechanical thrust of the piston 28 toward the swash plate and to provide lubrication between the piston shoe and the swash plate.

Referring again to FIGS. 2, 3 and 4, it will be seen that a pair of hydrostatic balance pads 57, 58 are located in the surface of each piston. One of these pads, 58, is located near the inner or pressure end 59 of the piston while the other pad, 57, is located adjacent the outer end of the cylinder bore 27.

The inner pad 58 is in the form of a pair of interconnected flats 60, 61 milled into the inner end section of the piston 28. As viewed in cross section through the flats, each flat 60, 61 defines a chord across a 60° arcuate section of the piston. Since the two flats are interconnected, together they define a pressure pocket of approximately 120 arcuate degrees on one side of the piston.

The outer hydrostatic balancing pad or pocket 57 is located on the opposite side of the piston from the first or inner pocket 58. It is defined by similar shaped and sized chordal flats 62, 63. These flats are also interconnected so that together they define an arcuate pocket of approximately 120° in the surface of the piston.

Since the inner end hydrostatic balance pad 58 communicates with the inner pressure end 59 of the piston, fluid under pressure is supplied to it directly from the bore 27 of the barrel within which the piston is reciprocable. To supply fluid to the other pocket 57 which is located midway in the length of the piston and does not communicate directly with the end, a radial bore 64 is provided between the center of the pocket 57 and the interior axial bore 53 of the piston. Thus, fluid under pressure in the cylinder bore 27 is supplied to each of the pockets or pads 57, 58.

Pressure in the pad 58 acting between the piston 28 and the cylinder bore 27 creates a force F3 which can be represented vectorily by the arrow F3. Similarly pressure in the pocket 57 acting between the piston and the cylinder can be represented vectorily by the arrow F2. The area of these pads and their location axially of the piston is so calculated as to counterbalance substantially all of the side force component F4 of the pressure force vector F1 created by the swash plate 33 acting through the piston shoe 32 upon the end of the piston 28. If these forces exactly counterbalance each other, there is no uneven lateral or side pressure between the piston 28 and the bore 27 of the barrel 16.

In order to isolate the force vectors F2 and F3 so that they are effectively applied at the center of the hydrostatic balance pads 57, 58, these pressure pads are surrounded or isolated by a series of grooves 65, 67, 68, 69, and 70 which are best seen in FIG. 3. These grooves are all connected to case, tank or atmospheric pressure. In this way, the high pressure of the fluid in the pockets 57, 58 is not distributed throughout all of the fluid trapped in the clearance space between the walls of piston 28 and the bore 27 of the barrel 16.

There are two grooves 65, one on each side of the piston, and these grooves extend longitudinally of the piston from the outer end 71 to a point adjacent the inner end 59 where they are interconnected by the arcuate groove 69. This latter groove 69 extends between the two longitudinal grooves 65 on the side of the piston opposite the end pad 58. A pair of similar arcuate grooves 67, 68 are provided on opposite sides of the central pad 57.

These grooves 67, 68 are likewise interconnected to case, tank or atmospheric pressure by the longitudinal grooves 65. For balancing and lubrication purposes, the groove 67 extends circumferentially completely around the piston. One other low pressure arcuate groove 70 is provided adjacent the end of the pressure pad 58 so as to preclude high pressure of the fluid acting upon this pad from being transmitted through the clearance space between the piston and the bore. Because these grooves are all connected to case or atmospheric pressure, they effectively preclude the high pressure in the hydrostatic balance pads 57, 58 from being distributed throughout the clearance area between the piston and bore. In this way, these pressure pads 57, 58 create vector forces F2, F3 which act to offset frictional force between the barrel and the piston.

In operation, the force created by the swash plate 33 acting through the piston shoes 32 on the end of the piston 28 creates a resultant force which may be represented vectorially by the arrow F1 in FIG. 3. The lateral pressure component F4 of this vector causes the undesirable piston-barrel bore side friction which creates many problems in fluid energy translating devices or machines; specifically excessively high break-away differential pressure requirements and high minimum speed characteristics. To counteract this side friction, high pressure fluid is supplied to the pressure pads 57, 58. Since the knuckle joint between the piston shoe 32 and the end 31 of the piston 28 insures rotation of the piston relative to the barrel, the counterbalancing forces created by the high pressure fluid in the hydrostatic balance pads 57, 58 remains unidirectional. The grooves surrounding the hydrostatic balance pads 57, 58 isolate these pads so as to preclude the high pressure fluid acting within them from being distributed throughout the clearance space between the piston and the bores since these grooves are all connected to case or atmospheric pressure.

While a preferred embodiment of the invention has been illustrated and described herein, numerous changes and modifications will be readily apparent to those skilled in this art without departing from the spirit and scope of my invention as defined in the appended claims.

Having described my invention, I claim:

1. A hydraulic fluid pressure energy translating device comprising,
   a rotatable body having a plurality of cylinder bores within each one of which a cylindrical piston is rotatable and reciprocable;
   a cylindrical piston mounted within each of said cylinder bores;
   a force transmitting shoe engageable with one end of each of said pistons;
   a plate-like cam means for imparting reciprocating motion to each of said pistons within its bore through said shoes;
   means on each of said pistons forming a pair of axially spaced hydrostatic balance pads in opposite sides thereof operable between each of said pistons and its bore to counterbalance lateral force imparted to said piston by said plate-like cam means; and
   a knuckle joint between each of said shoes and pistons operable to permit rotation of said piston in its bore while simultaneously preventing rotation of said piston about its own axis to maintain said axially spaced hydrostatic balance pad means oriented counter to the lateral force imparted to said piston by said cam means.

2. A hydraulic fluid pressure energy translating device comprising,
   a rotatable body having a plurality of cylinder bores within each of which a cylindrical piston is rotatable and reciprocable;
   a cylindrical piston mounted within each of said cylinder bores;
   plate-like cam means for imparting reciprocatory motion to said cylindrical pistons with respect to said cylinder bores;
   connecting means between said pistons and said cam means for preventing said cylindrical pistons from rotating upon their own axes while simultaneously permitting rotation of said pistons in their cylinder bores upon rotation of said body; and
   means forming a pair of axially spaced high pressure hydrostatic balance pads in opposite sides of each of said cylindrical pistons operable between the pistons and their cylinder bores to counterbalance side thrusts imparted to said cylindrical pistons by said cam means.

3. A hydraulic fluid pressure energy translating device comprising,
   a rotatable cylinder barrel having a plurality of cylinder bores within each one of which a piston is rotatable and reciprocable;
   a piston mounted within each of said cylinder bores;
   a plate-like means including a cam surface for imparting reciprocating motion to each of said pistons within its cylinder bore upon rotational movement of said barrel relative to said cam surface;
   means forming a pair of axially spaced hydrostatic balance pads in opposite sides of each of said pistons operable between each of said pistons and its bore to counterbalance lateral force imparted to said piston by said cam surface; and
   connecting means between said pistons and said plate-like means operable to prevent rotation of said pistons upon their own axes while simultaneously permitting rotation thereof in their said cylinder bores to maintain said hydrostatic balance pad forming means oriented counter to the lateral force imparted to said pistons by said cam surface as said cylinder barrel rotates.

4. A hydraulic fluid pressure energy translating device comprising,
   a rotatable cylinder body having a plurality of cylinder bores within each one of which a piston is rotatable and reciprocable;
   a piston mounted within each of said bores;
   a force transmitting shoe connected to one end of each of said pistons;
   a plate-like cam surface for imparting reciprocatory motion to said shoes with respect to said cam surface so as to cause reciprocable motion of said piston within its cylinder bore;
   a pair of axially spaced hydrostatic balance pads in opposite sides of said pistons operable between each of said pistons and its cylinder bore to counterbalance lateral force imparted to said pistons by said cam surface;
   each of said hydrostatic balance pads comprising means forming a recess in the surface of each of said pistons, means for admitting high pressure fluid to said recesses, and grooves in the surface of said piston adjacent said recesses, said grooves being connected to low case pressure; and
   a knuckle joint between said shoes and said pistons operable to permit said pistons to rotate in their cylinder bores and to maintain said axially spaced hydrostatic balance pads oriented counter to a lateral force imparted to said piston by said cam surface, said knuckle joint comprising a generally cylindrical end of said piston mounted within a matingly configurated recess in said shoe.

5. A hydraulic fluid pressure energy translating device comprising,
   a rotatable body having a plurality of cylinder bores within each one of which a piston is rotatable and reciprocable;
   a piston mounted within each of said cylinder bores;
   a force transmitting shoe engageable with one end of each of said pistons;

a plate-like cam means for imparting a reciprocating force to each of said shoes so as to cause reciprocation of said pistons within their bores;

a pair of axially spaced hydrostatic balance pads operable between each of said pistons and said bores to counterbalance lateral force imparted to said piston by said plate-like cam means, one of said balance pads being located on one side of said piston adjacent the other end of said piston and the other pad being located on the opposite side of said piston approximately medially of the length of said piston; and connecting means between said piston and said cam means operable to maintain said axially spaced hydrostatic balance pads oriented counter to the lateral force imparted to said piston by said cam means.

6. A hydraulic fluid pressure energy translating device comprising, a rotatable body having a plurality of cylinder bores within each one of which a piston is rotatable and reciprocable;

a piston mounted within each of said bores;

a force transmitting shoe on one end of each of said pistons;

a plate-like cam means for imparting reciprocatory motion to each of said shoes so as to cause corresponding reciprocatory motion to said pistons as said shoe slide on said cam means;

a pair of axially spaced hydrostatic balance pads on said pistons operable between each of said pistons and said cylinder bores to counterbalance lateral force imparted to said pistons by said plate-like cam means; and a direction controlled joint between said shoes and said pistons operable to maintain said axially spaced hydrostatic balance pads oriented counter to a lateral force imparted to said piston by said cam means, said joint comprising a generally cylindrical element mounted within a matingly configurated recess.

7. A hydraulic fluid pressure energy translating device comprising, a rotatable body having a plurality of cylinder bores within each one of which a piston is rotatable and reciprocable;

a piston mounted within each of said bores;

a force transmitting shoe on one end of each of said pistons;

a plate-like cam means for imparting reciprocatory motion to each of said shoes so as to cause reciprocation of said pistons;

a pair of axially spaced hydrostatic balance pads in opsite sides of each of said pistons operable between the pistons and their bores to counterbalance lateral forces imparted to said pistons by said plate-like means;

each of said hydrostatic balance pads comprising a recess in the surface of the piston, means for supplying high pressure fluid to said recess, and groove means in the surface of said piston adjacent said recess, said groove means being connected to low pressure; and a direction controlled joint between said shoes and said pistons operable to maintain said axially spaced hydrostatic balance pads oriented counter to the lateral force imparted to said piston by said plate-like means.

8. A hydraulic fluid pressure energy translating device comprising, a rotatable body having a plurality of cylinder bores within each one of which a piston is rotatable and reciprocable;

a piston mounted within each of said cylinder bores;

a force transmitting shoe on one end of each of said pistons;

a plate-like cam means for imparting reciprocatory motion each of said shoes so as to cause reciprocatory motion of said pistons;

a pair of axially spaced hydrostatic balance pads on opposite sides of said pistons operable between each of said pistons and its bore to counterbalance lateral force imparted to said piston by said plate-like cam means;

each of said axially spaced hydrostatic balance pads comprising a recess formed in the surface of the piston, means for supplying high pressure fluid to said recess, and groove means in the surface of said piston adjacent said recess, said groove means being connected to low pressure; and connecting means between said piston and said cam means operable to permit rotation of said piston within said cylinder bores while preventing rotation of said piston about its own axis so as to maintain said hydrostatic balance pads oriented counter to the lateral force imparted to said piston by said cam means as said shoes slide thereon.

9. A hydraulic fluid pressure energy translating device comprising, a rotary cylinder barrel having a plurality of cylinder bores within each one of which a piston is rotatable and reciprocable;

a cylindrical piston mounted within each of said bores;

means including a cam plate for imparting reciprocating motion to each of said pistons upon rotational movement of said cylinder barrel relative to said cam plate;

a pair of axially spaced hydrostatic balance pads in opposite sides of each piston operable between it and its bore to counterbalance a lateral force imparted to said piston by said cam plate;

each of said axially spaced hydrostatic balance pads comprising a recess in the surface of a piston, means for supplying high pressure fluid to said recess, and groove means in the surface of said piston adjacent said recess, said groove means being connected to low pressure; and connecting means between said pistons and said cam plate means operable to permit rotation of said pistons within said cylinder bores while preventing rotation of said pistons about their own axes so as to maintain said hydrostatic balance pads oriented counter to the lateral force imparted to said pistons by said cam plate.

10. A hydraulic fluid pressure energy translating device comprising, a rotatable body having a plurality of cylinder bores within each one of which a piston is rotatable and reciprocable;

a piston mounted within each of said bores;

a force transmitting shoe on one end of each of said pistons;

a plate-like cam means for imparting reciprocatory motion to each of said shoes so as to cause reciprocatory motion of said pistons;

a pair of axially spaced hydrostatic balance pads operable between each of said pistons and said bores to counterbalance lateral force imparted to said piston by said cam means, one of said balance pads being located on one side of said piston adjacent the other end of said piston and the other pad being located on the opposite side of said piston approximately medially of the length of said piston;

each of said hydrostatic balance pads comprising a recess in the surface of a piston, conduit mean for supplying high pressure fluid to said recess, and groove means in the surface of said piston adjacent said recess, said groove means being connected to low case pressure; and connecting means between said piston and said cam means operable to maintain said hydrostatic balance pads oriented counter to the lateral force imparted to said piston by said cam means.

References Cited by the Examiner

UNITED STATES PATENTS

| | | | |
|---|---|---|---|
| 1,231,249 | 6/1917 | Gardner | 64—8 |
| 1,487,965 | 3/1924 | Michell | 103—162 |
| 1,829,392 | 10/1931 | Caldwell | 64—7 |
| 3,106,138 | 10/1963 | Thoma | 103—162 X |
| 3,142,262 | 7/1964 | Firth et al. | 103—162 |

FOREIGN PATENTS

| | | |
|---|---|---|
| 693,064 | 6/1953 | Great Britain. |
| 947,060 | 1/1964 | Great Britain. |

MARTIN P. SCHWADRON, *Primary Examiner.*

EDGAR W. GEOGHEGAN, *Examiner.*

I. C. COHEN, *Assistant Examiner.*